(12) United States Patent
Morimoto

(10) Patent No.: US 6,266,301 B1
(45) Date of Patent: Jul. 24, 2001

(54) OPTICAL STORAGE DEVICE AND OPTICAL HEAD HAVING TES COMPENSATION SHIFT SIGNAL COMPENSATION

(75) Inventor: Yasuaki Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/189,392

(22) Filed: Nov. 10, 1998

(30) Foreign Application Priority Data

Feb. 20, 1998 (JP) ................................................ 10-039128

(51) Int. Cl.⁷ .................................................... G11B 7/095
(52) U.S. Cl. .................... 369/44.23; 369/112.28
(58) Field of Search ............................ 369/44.32, 44.35, 369/44.36, 112.28, 112.16

(56) References Cited

U.S. PATENT DOCUMENTS

| | | | | |
|---|---|---|---|---|
| 4,841,508 | * | 6/1989 | Kimura | 369/44.23 X |
| 4,866,688 | * | 9/1989 | Ohtake et al. | 369/44.28 X |
| 4,924,455 | * | 5/1990 | Fujiie et al. | 369/44.21 |
| 5,142,520 | * | 8/1992 | Yanagi et al. | 369/44.32 X |
| 5,283,774 | * | 2/1994 | Mashimo | 369/44.32 |
| 5,517,475 | * | 5/1996 | Koyama et al. | 369/44.32 |
| 5,717,668 | * | 2/1998 | Sohmuta | 369/44.32 X |
| 5,768,229 | | 6/1998 | Ikeda | 369/44.28 |
| 5,787,059 | * | 7/1998 | Sohmuta | 369/44.32 X |
| 5,828,637 | * | 10/1998 | Kim | 369/44.32 X |
| 5,963,516 | * | 10/1999 | Hashimoto et al. | 369/44.32 X |
| 5,982,722 | * | 11/1999 | Hashimoto | 369/44.34 X |
| 6,044,050 | * | 3/2000 | Kuroiwa | 369/44.32 X |

FOREIGN PATENT DOCUMENTS

| | | |
|---|---|---|
| 9631928 | 2/1997 | (DE). |
| 7093764 | 7/1995 | (EP). |
| 9091729 | 4/1997 | (EP). |
| 0803864 | 10/1997 | (EP). |
| 0809241 | 11/1997 | (EP). |
| 61-276137 | 12/1986 | (JP). |
| 1125733 | 5/1989 | (JP). |
| 10-134373 | * 6/1991 | (JP). |
| 413239 | 1/1992 | (JP). |
| 547017 | 2/1993 | (JP). |
| 7-192288 | * 7/1995 | (JP). |
| 9-219030 | * 7/1995 | (JP). |
| 7254188 | 10/1995 | (JP). |
| 9008881 | 7/1990 | (WO). |
| WO 91/08568 | * 6/1991 | (WO). |

OTHER PUBLICATIONS

Abstract of JP 9055014, Feb. 25, 1997.*

* cited by examiner

*Primary Examiner*—Aristotelis M. Psitos
(74) *Attorney, Agent, or Firm*—Greer, Burns & Crain, Ltd.

(57) ABSTRACT

Disclosed is an optical storage device for reading information from an optical storage medium by an optical head. The optical storage device comprises an optical head including a track actuator for scanning on the skew across tracks on the optical storage medium by the laser beam, and a divided-by-4 light receiving unit for receiving the laser beam from the optical storage medium, a moving motor for moving the optical head, a first signal processing unit for calculating a track error signal on the basis of an output of the divided-by-4 light receiving unit, a second signal processing unit for calculating a shift signal of the objective lens from the output of the divided-by-4 light receiving unit, and a control unit for controlling the track actuator or the moving motor by the track error signal, and controlling the track actuator or the moving motor so that the laser beam passing through the objective lens is located at the center of the objective lens. With this construction, a lens position can be detected, and hence a lens position sensor becomes unnecessary.

16 Claims, 16 Drawing Sheets

FIG. 12

S10
- track servo off (SW3 : OFF)

S11
- Count the number of track by push-pull signal or track cross signal

S12
- Track sevo on (SW3 : ON) Reproduce a control track and confirm a track pitch S13
- Calculate eccentric quantity S14
- Calculate eccentric characteristics from amplitude and phase of of objective lens shift monitor signal S15
- Memorize in eccentric memory

OPTICAL STORAGE DEVICE AND OPTICAL HEAD HAVING TES COMPENSATION SHIFT SIGNAL COMPENSATION

BACKGROUND OF THE INVENTION

1. Field of the Invention

The present invention relates generally to an optical storage device for reading or reading/writing information from and to an optical storage medium by use of an optical head and, more particularly, to an optical storage device for controlling a movement of a light beam.

2. Description of the Related Art

In an optical storage device such as an optical disk device etc, an optical head irradiates an optical storage medium with a light beam, thereby reading and writing information. In this optical storage device, a laser spot for scanning an information track on an optical disk is located on the information track. An objective lens of the optical head is therefore precisely moved in a track direction as well as in a focusing direction. A decrease in weight of the optical head is required of this optical storage device.

FIG. 16 is an explanatory diagram showing the prior art.

An optical disk 90 is formed with an information track in a spiral configuration or in a concentric configuration. An optical head 91 comprises a movable member 91-1 and a fixed member 91-2. The movable member 91-1 is provided with an objective lens 92, a focus actuator 93 for moving the objective lens 92 in the focusing direction, a track actuator 94 for moving the objective lens in the track direction, a lens position sensor 95, and a deflection mirror 96.

The fixed member 91-2 includes a light emitting diode and a divided-by-4 light receiving unit. A light beam emitted from the light emitting diode of the fixed member 91-2 is incident upon the objective lens 92 via the deflection mirror 96, and falls upon the optical disk 90. The light beam reflected from the optical disk 90 is incident upon the fixed member 91-2 via the objective lens 92 and the deflection mirror 96.

In the fixed member 91-2, the reflected light beam is received by the divided-by-4 light receiving unit in which a light receiving element is divided by 4. A signal generating circuit 98 calculates an output of the divided-by-4 light receiving unit, and generates a focus error signal FES, a track error signal TES and an ID signal etc. The focus error signal FES indicates a focusing-directional deviation of the light beam from the track.

A DSP-based control circuit 99 focus-servo-controls the focus actuator 93 on the basis of the focus error signal FES, and thus adjusts a focusing position of the light beam. The track error signal TES indicates a track-directional deviation of the light beam. A control circuit 99 track-servo-controls the track actuator 94 on the basis of the track error signal TES, and thus locates the light beam on the track.

A motor 97 constructed of a linear motor etc moves the movable member 91-1 of the optical head 91 in a track traversing direction of the optical disk 90. The optical head 91 is thereby subjected to a coarse seek process.

In this construction, the lens position sensor 95 generates a lens position signal LPOS indicating a position of the objective lens 92. This lens position signal LPOS is, when the optical head 91 is moved by the motor 97 (when in the coarse seek process), used for locking the objective lens 92. More specifically, when in the coarse seek process, a present position is detected based on the track error signal TES, thereby executing the seek control. Therefore, if the objective lens 92 is not fixed, the present position is unable to be accurately detected. Hence, the control circuit 99 controls the track actuator 94 on the basis of the lens position signal LPOS. The objective lens 92 is thereby locked.

Further, the lens position signal LPOS is used for, with the movement of the objective lens 92, when implementing a track access process (a track jump process), detecting the position of the objective lens. Moreover, the lens position signal LPOS is used for, when performing eccentricity compensation control of the optical disk, detecting the position of the objective lens 92.

Thus, the seek control is carried out so that the light beam is disposed in a central position of the objective lens 92 by use of the lens position signal LPOS. The generation of the thus-used lens position signal LPOS involves providing the movable member 91-1 of the optical head 91 with the lens position sensor 95.

There arise, however, the following problems inherent in the prior art.

First, the optical head 91 is light in weight, which is better for the optical head effecting a high-speed seek to a target track. Therefore, the movable member 91-1 of the optical head 91 is mounted with only parts needed for making the movable member 91-1 movable. The movable member 91-1 is, however, required to be mounted with the lens position sensor 95, and hence the weight of the movable member 91-1 can not be reduced. It is therefore difficult to speed up the seeking process.

Second, since the lens position sensor 95 consists essentially of the light emitting unit and the light receiving unit, the costs thereof are high. Consequently, the optical storage device has a difficulty to be constructed at low costs.

SUMMARY OF THE INVENTION

It is a primary object of the present invention to provide an optical storage device capable of speeding up a seeking process by reducing a weight of an optical head.

It is another object of the present invention to provide an optical storage device capable of making the optical head constructed at low costs.

It is still another object of the present invention to provide an optical storage device capable of generating a lens position signal without providing a lens position sensor.

According to one aspect of the present invention, an optical storage device for reading information from an optical storage medium by an optical head, comprises an optical head including an objective lens for irradiating the optical storage medium with a laser beam, a track actuator for scanning on the skew across tracks on the optical storage medium by the laser beam, and a divided-by-4 light receiving unit for receiving the laser beam from the optical storage medium, a moving mechanism for moving the objective lens and the track actuator of the optical head, a first signal processing circuit for calculating a track error signal on the basis of an output of the divided-by-4 light receiving unit, a second signal processing circuit for calculating a shift signal for indicating a shift quantity of the objective lens from the output of the divided-by-4 light receiving unit, and a control circuit for controlling the track actuator or the moving mechanism by the track error signal, and controlling the track actuator or the moving mechanism so that the laser beam passing through the objective lens is located at the center of the objective lens.

According to the present invention, a lens position signal is generated from the output of the divided-by-4 light receiving unit. Therefore, the tracks on the optical storage medium are scanned obliquely by the laser beam. With this contrivance, a distribution of reflected light incident upon the divided-by-4 light receiving unit corresponds to the shift quantity of the objective lens. The shift signal for indicating the objective lens shift quantity is calculated based on the output of the divided-by-4 light receiving unit, whereby the shift signal for indicating the objective lens shift quantity can be obtained.

Consequently, a position of the objective lens can be detected without providing the lens position sensor. It is therefore possible to reduce a weight of the optical head and speed up a seeking process. Further, since the lens position sensor may not be provided, costs for the optical head can be decreased.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 12 is a flowchart showing an eccentric data measuring process in FIG. 11;

DETAILED DESCRIPTION OF THE PREFERRED EMBODIMENTS

Figure 1:
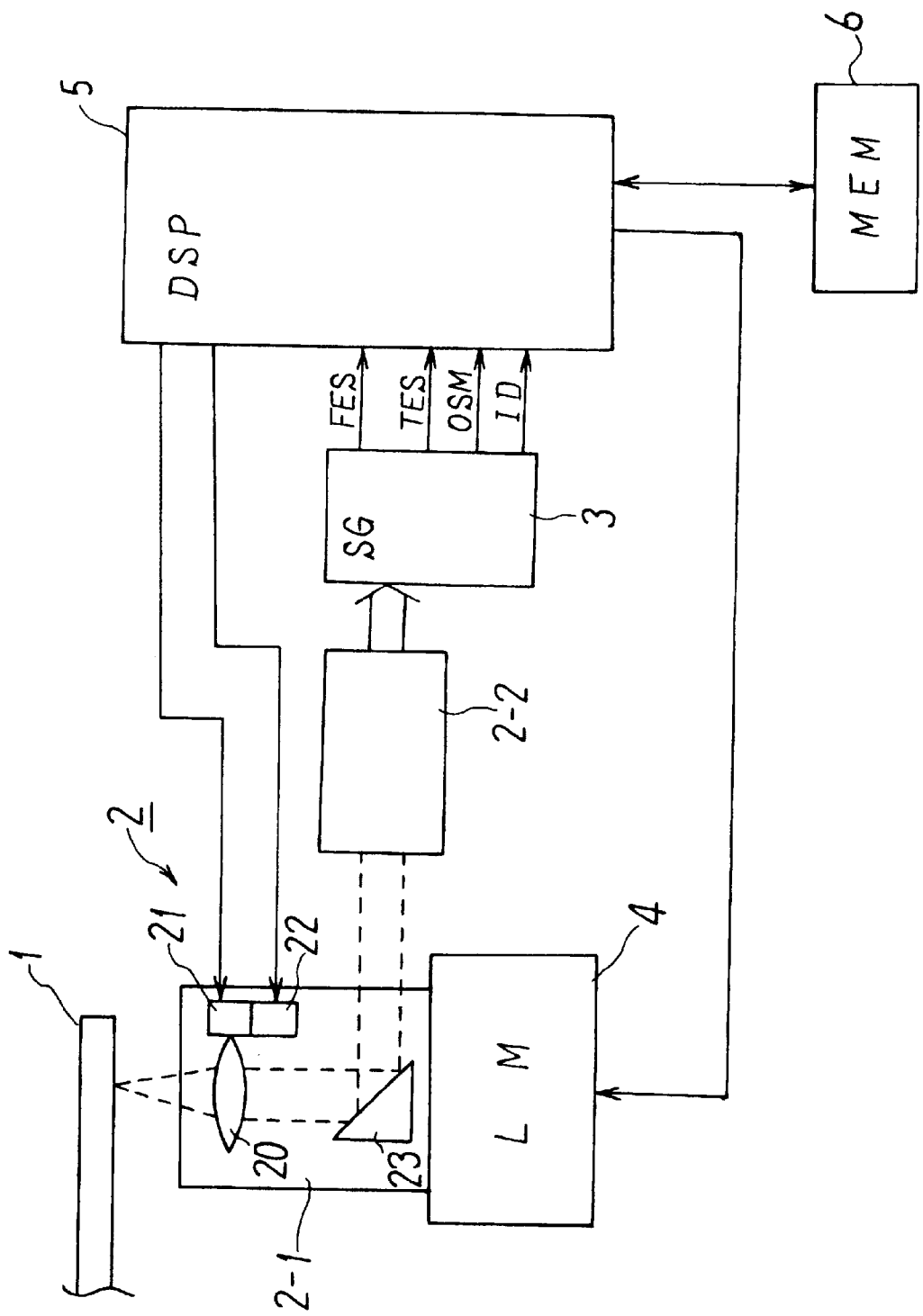
FIG. 1 is a diagram showing a whole construction in one embodiment of the present invention.
Figure 2:
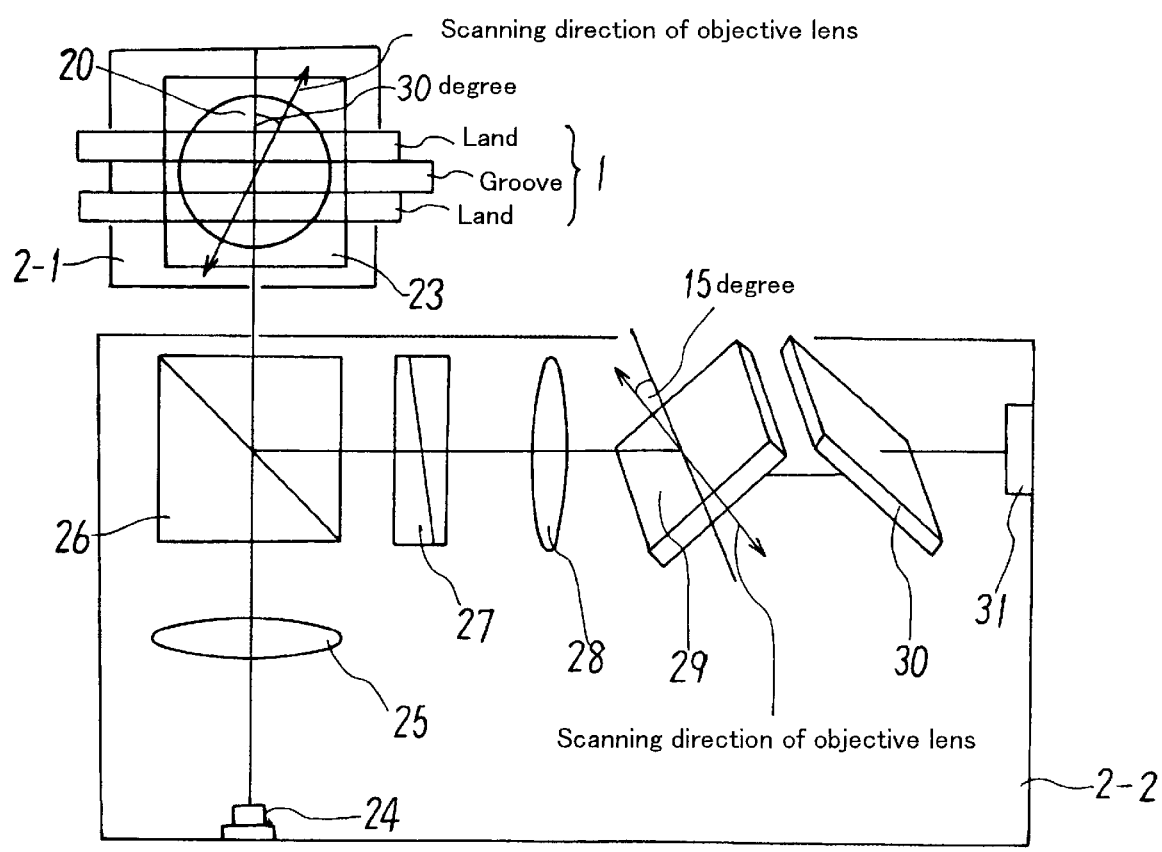
FIG. 2 is a view showing a construction of an optical head in FIG. 1.
Figure 3:
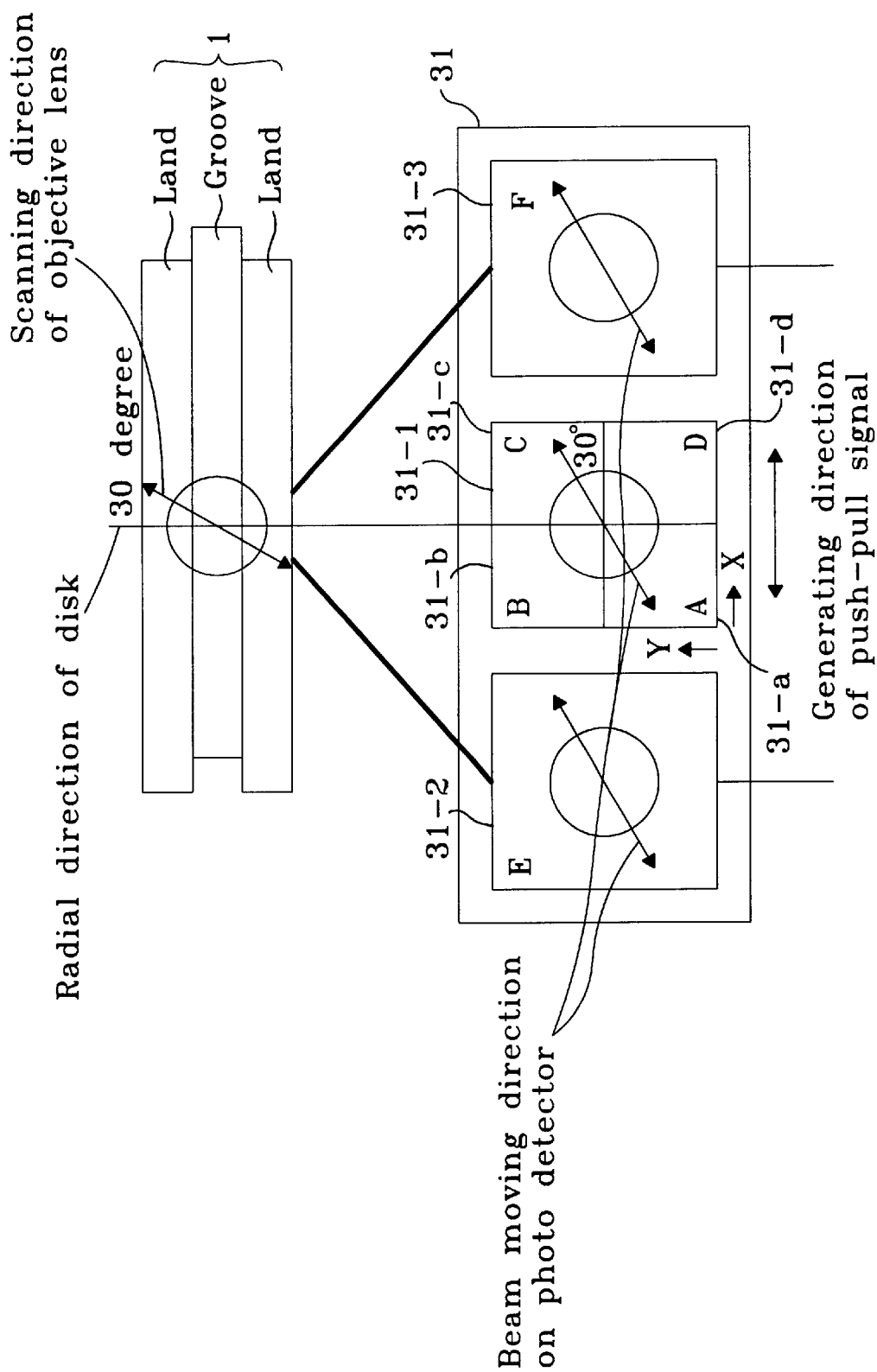
FIG. 3 is a diagram showing a relationship between an photo detector and a beam spot in FIG. 2.
Figure 4:
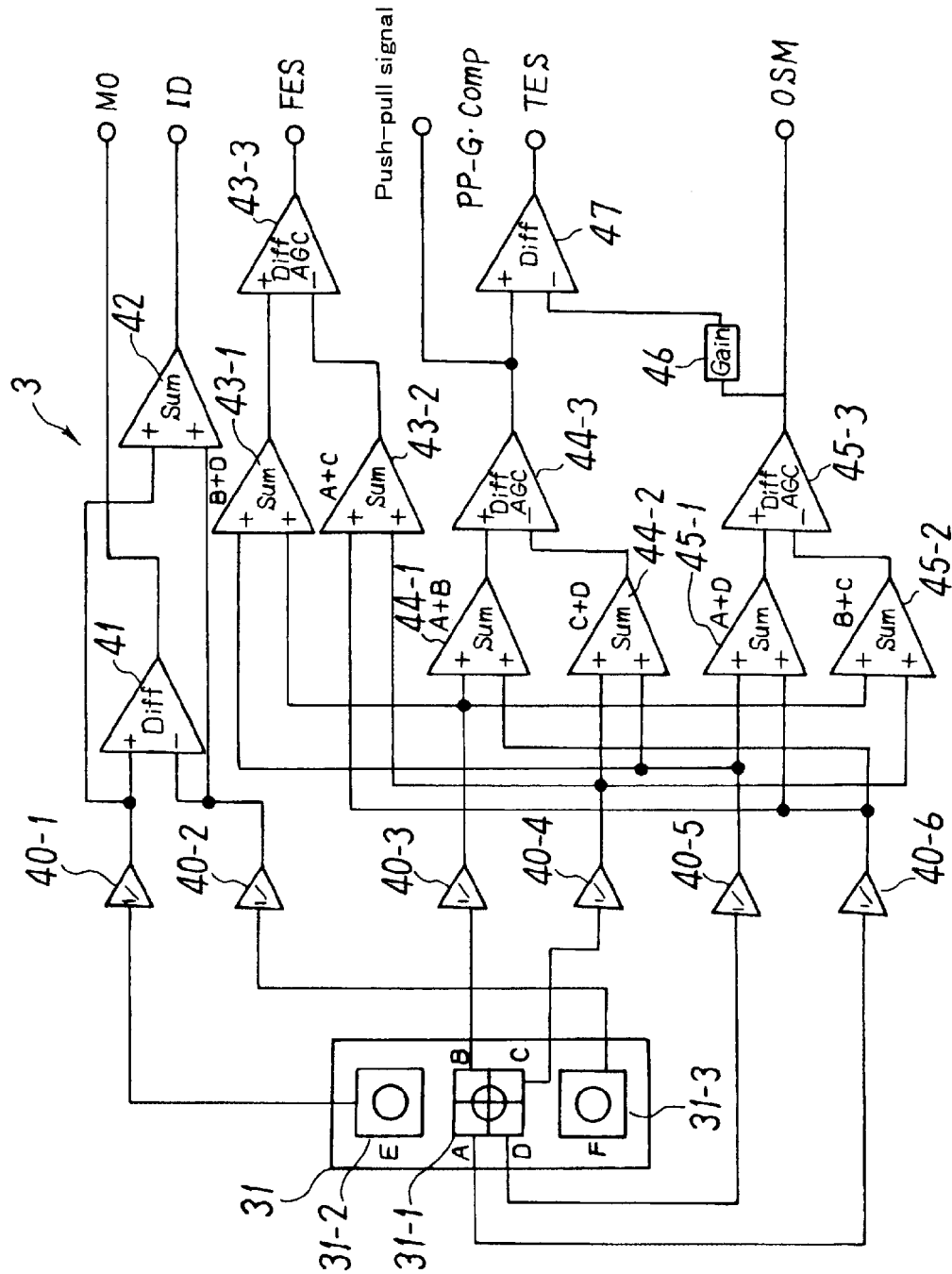
FIG. 4 is a diagram showing a configuration of a signal generating circuit in FIG. 2.

FIG. 1 is a diagram showing a whole construction in one embodiment of the present invention. FIG. 2 is a view showing a construction of an optical head. FIG. 3 is a view showing a relationship between a photo detector and a beam spot. FIG. 4 is a diagram showing a signal generating circuit in FIG. 1.

As illustrated in FIG. 1, a magneto-optic disk 1 is formed with an information track in a spiral configuration. A movable unit 2-1 of an optical head 2 is provided with a focus actuator 21, a track actuator 22 and a deflection mirror 23. A fixed member 2-2 of the optical head 2 is provided with a semiconductor laser, and a photo detector etc.

The movable member 2-1 is mounted on a positioner (a linear motor) 4. The positioner 4 makes the movable member 2-1 positioned. The signal generating circuit 3, as will be explained later on, generates a focus error signal FES, a track error signal TES, a lens shift signal OSM and an ID signal ID.

A control circuit 5 including a DSP (Digital Signal Processor) controls the focus actuator 21, the track actuator 22 and the positioner 4 on the basis of the signals FES, TES, OSM and ID transmitted from the signal generating circuit 3. A memory 6 is stored with an eccentric signal for controlling eccentricity.

The optical head 2 is explained referring to FIG. 2. A light beam emitted from a semiconductor laser 24 is, after being collimated by a collimator lens 25, incident upon a polarization beam splitter 26. The light beam having passed through the polarization beam splitter 26 is incident on the movable member 2-1. In the movable member 2-1, the incident light beam is then incident upon an objective lens 20 through the deflection mirror 23 and falls upon a land or groove which constitute the information track on the magneto-optic recording disk 1.

Then, the objective lens 20 is moved by the track actuator 22 so as to scan on the skew across the information track. The light beam reflected from the information track travels through the objective lens 20 and becomes incident upon the polarization beam splitter 26 via the deflection mirror 23. The polarization beam splitter 26 reflects the incident light beam in accordance with a polarizing characteristic, and the reflected light beam is incident on a Wollaston prism. 27

The Wollaston prism 27 separates the light beam into a P-polarized light component, an S-polarized light component and a light component into which the P-polarized light component and the S-polarized light component are mixed. The thus separated three light beams are converted into a convergent light beam by a convergent lens 28. A first plane glass 29 is disposed in such a way that an incident surface is inclined at 45 degrees to the sheet surface and the light beam is incident substantially at 45 degrees thereupon. A second plane glass 30 is so disposed that an incident surface thereof is inclined at 45 degrees to the sheet surface and the light beam is incident substantially at 45 degrees thereupon.

These two plane glasses 29, 30 each perform a function of a cylindrical (astigmatism) lens. The convergent light beam passing through the two plane glasses 29, 30 is incident upon a photo detector 31 (which will be described later on referring to FIG. 3).

As illustrated in FIG. 3, the photo detector 31 is constructed of an E-element 31-2 upon which the P light component is incident, an F-element 31-3 upon which the S light component is incident, and a divided-by-4 element 31-1 upon which the mixed light component of the P light component and the S light component is incident. The divided-by-4 element 31-1 consists essentially of an A-element 31-*a*, a B-element 31-*b*, a C-element 31-*c*, and a D-element 31-*d*.

A beams spot on the information track on the optical disk 1 moves at 30 degrees to the radial direction of the disk 1, beams spots of the photo detectors 31-1, 31-2, 31-3 move as shown in FIG. 3. The beam spots of the photo detectors 31-1, 31-2, 31-3 move in directions different from the direction of the beam spot on the information track.

Herein, let "A", "B", "C", "D" be detection outputs of the respective elements 31-a, 31-b, 31-c, 31-d of the divided-by-4 element 31-1. A push-pull signal TES for obtaining the track error signal TES is generated due to an X-directional change in a reflected light distribution of the divided-by-4 element 31-1. To be specific, the push-pull signal is generated by effecting a calculation such as (A+B)–(C+D).

Further, the beam spot moves obliquely, and hence the beam spot of the divided-by-4 element 31-1 shows a Y-directional change with the movement thereof. This Y-directional distribution of the beam spot on the divided-by-4 element 31-1 corresponds to a shift quantity of the objective lens. Namely, a lens shift signal OSM for indicating a shift quantity of the objective lens can be generated by implementing a calculation such as [(A+D)–(B+C)]. This implies that the lens shift signal OSM for indicating the shift quantity of the objective lens can be generated by using a wave drive signal in a direction orthogonal to a push-pull signal generating direction.

As shown in FIG. 4, the output currents A, B, C, D, E, F of the respective elements 31-1 (31-a to 31-d), 31-2, 31-3 of the photo detector 31 are converted into voltages by a current/voltage converters 40-1 to 40-6. A differential amplifier 41 subtracts the output F from the output E, thereby generating a magneto-optic signal MO.

A summing amplifier 42 adds the output E and the output F together, thereby generating a modulation signal ID based on a phase pit. A summing amplifier 43-1 adds the output B and the output D. A summing amplifier 43-2 adds the output A and the output C. A differential amplifier 43-3 subtracts the added output (A+C) from the added output (B+D). This differential output [(B+D)–(A+C)] turns out to be the focus error signal FES.

A summing amplifier 44-1 adds the output A and the output B. A summing amplifier 44-2 adds the output C and the output D. A differential amplifier 44-3 subtracts the added output (C+D) from the added output (A+B) This differential output [(A+B)–(C+D)] is the push-pull signal PP described above.

A summing amplifier 45-1 adds the output A and the output D. A summing amplifier 45-2 adds the output B and the output C. A differential amplifier 45-3 subtracts the added output (B+C) from the added output (A+D). This differential output [(A+D)–(B+C)] is the objective lens shift monitor signal described above.

Further, a gain imparting circuit 46 imparts a gain to the objective lens shift signal OSM. Thereafter the differential amplifier 47 subtracts the lens shift signal OSM from the push-pull signal PP. This signal is defined as the track error signal TES in which offset does not occur even when the objective lens shifts. Namely, the offset-compensated track error signal TES can be obtained.

Next, the objective lens shift quantity and the objective lens shift monitor signal are explained in much greater details. FIGS. 5 through 9 are explanatory diagrams of the objective lens shift signal.

Figure 5:
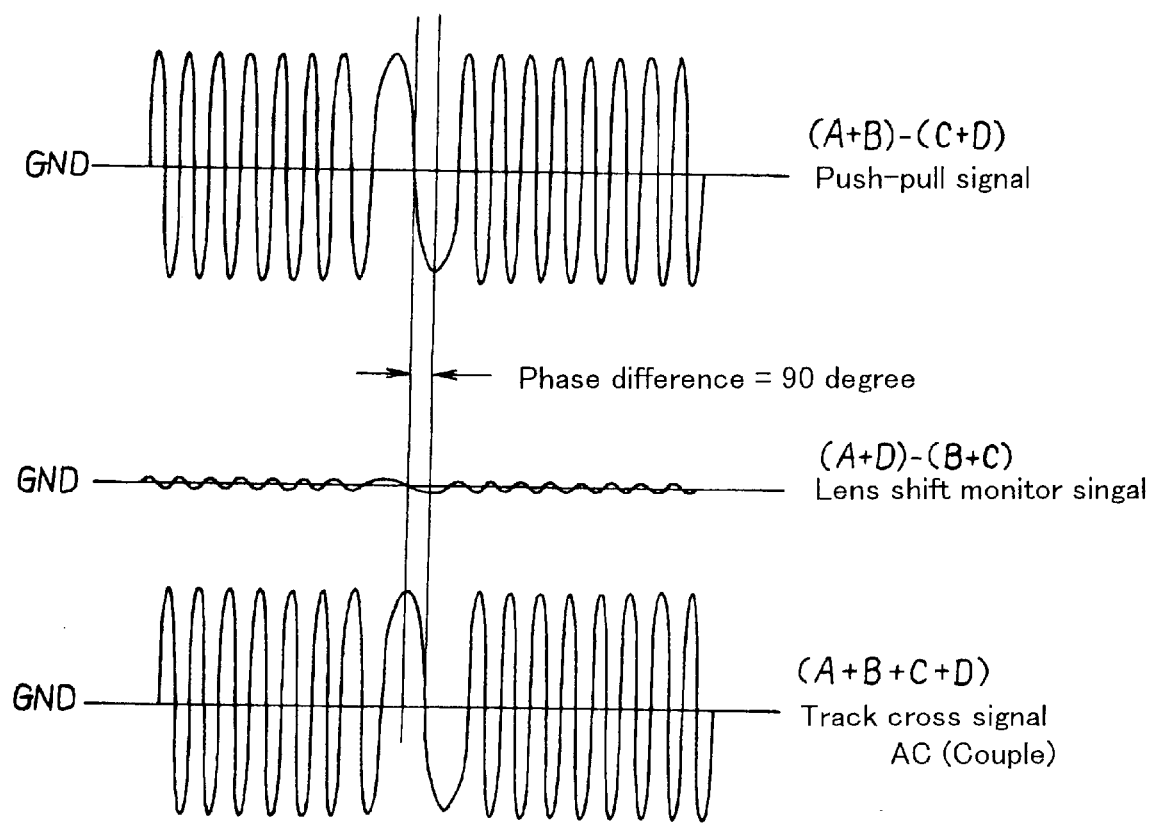
FIG. 5 is a diagram showing waveforms of an objective lens shift monitor signal at a track servo-OFF time according to the present invention.

FIG. 5 shows waveforms of the push-pull signal, the objective lens shift monitor signal and the track cross signal when the objective lens is not shifted at a track servo off-time. Both of the push-pull signal and the objective lens shift monitor signal are adjusted so that each signal center is coincident with a ground GND. Note that a phase of the push-pull signal PP is shifted 90 degrees with respect to a phase of the track zero cross signal.

Figure 6:
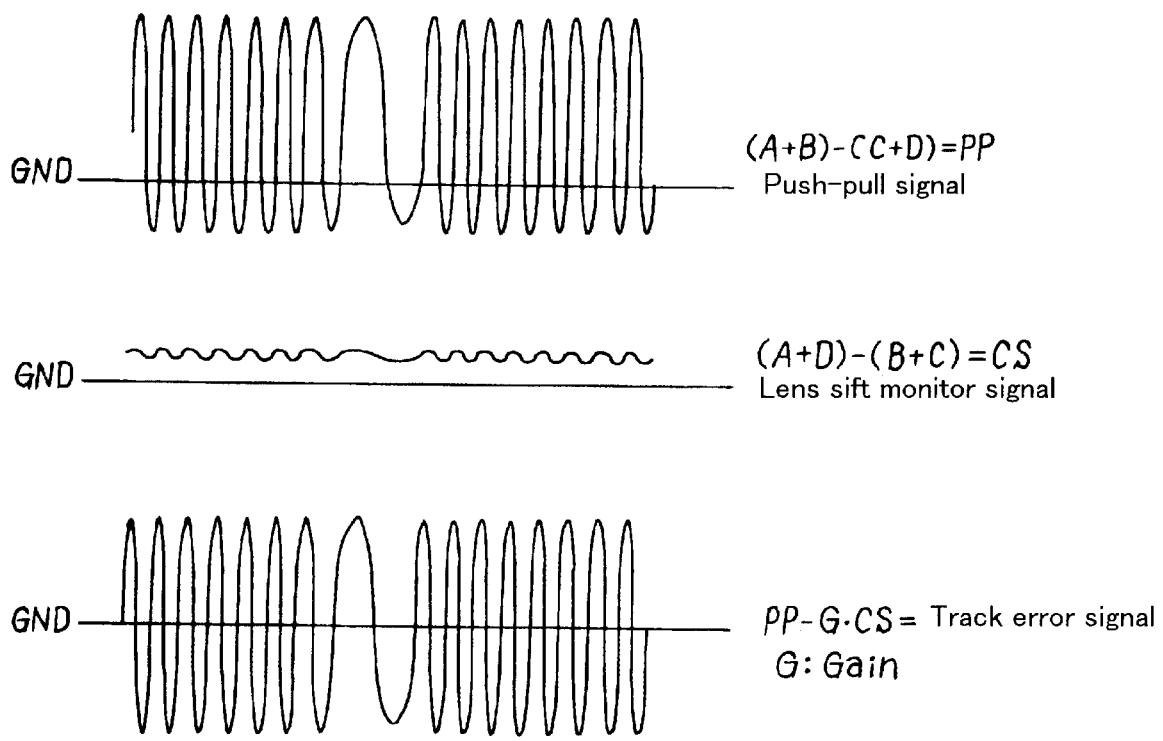
FIG. 6 is a diagram showing waveforms of the objective lens shift monitor signal when an objective lens is shifted according to the present invention.

FIG. 6 shows waveforms of the push-pull signal, the objective lens shift monitor signal and the track cross signal when the objective lens is forcibly shifted at the track servo off-time. Both of the push-pull signal and the objective lens shift monitor signal shift on a plus-side.

That is, it follows that the objective lens shift monitor signal indicates a shift quantity of the objective lens at the track servo off-time. Further, the push-pull signal PP also indicates the objective lens shift quantity. Herein, the track error signal is generated by subtracting the objective lens shift monitor signal from the push-pull signal. No offset appears in this track error signal. When this track error signal TES is used for the track control, the information track can be scanned with stability.

Figure 7:
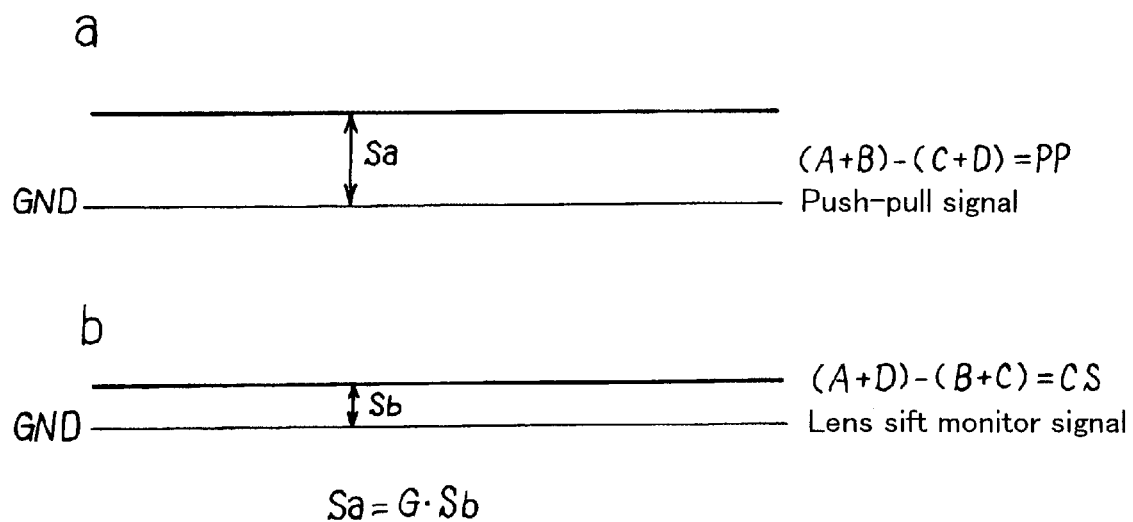
FIG. 7 is a diagram showing waveforms of the objective lens shift monitor signal at a track servo-ON time according to the present invention.

FIG. 7 shows waveforms of the push-pull signal PP and the objective lens shift monitor signals when the objective lens is forcibly shifted in such a case that the track control (track servo-ON) is carried out by the compensated track error signal TES shown in FIG. 6.

As shown in FIG. 7, the objective lens shift monitor signal OSM (CS) indicates the shift quantity of the objective lens at the track servo-ON time also. Further, the push-pull signal also indicates the objective lens shift quantity. Signal levels Sa, Sb thereof have a relationship such as Sa=G·Sb. Accordingly, it follows that the objective lens shift monitor signal OSM indicates the objective lens shift quantity at the track servo-OFF time and the track servo-ON time as well. Moreover, the push-pull signal PP also, when the compensated track error signal TES is used for the track servo, indicates the objective lens shift quantity.

Figure 8:
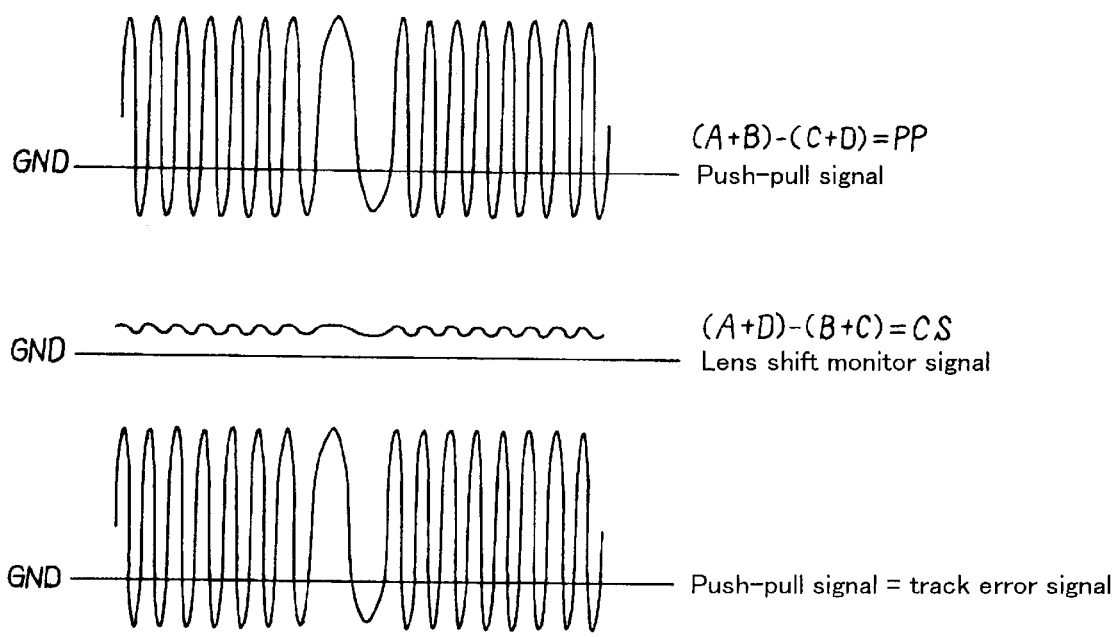
FIG. 8 is an explanatory diagram showing the objective lens shift monitor signal when the objective lens is shifted according to the present invention.
Figure 9:
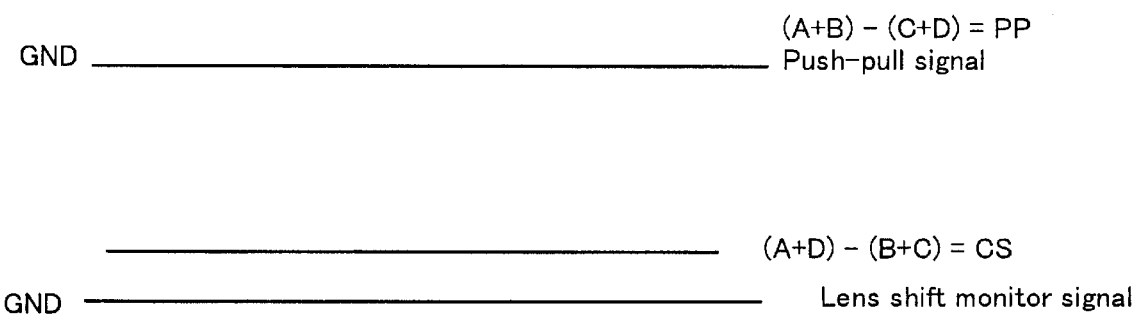
FIG. 9 is an explanatory diagram showing the objective lens shift monitor signal at the track servo-ON time according to the present invention.

Given next is an explanation of a case where the push-pull signal PP is used directly as a track error signal. FIGS. 8 and 9 show the case in which the push-pull signal is used directly as the track error signal. FIG. 8 shows waveforms of the push-pull signal and of the objective lens shift monitor signal when the objective lens is forcibly shifted at the track servo-OFF time. As illustrated in FIG. 8, both of the push-pull signal and the objective lens shift monitor signal have DC components corresponding to the objective lens shift quantities.

FIG. 9 shows waveforms of the push-pull signal and of the objective lens shift monitor signal when the objective lens is forcibly shifted in such a case that the track servo-ON process is done based on the push-pull signal. As shown in FIG. 9, the push-pull signal is controlled to the ground level GND. On the other hand, the objective lens shift monitor signal indicates the DC component corresponding to the objective lens shift quantity. Further, the push-pull signal goes down to the ground level and does not therefore indicate the objective lens shift quantity.

This implies that even when either the push-pull signal or the compensated track servo signal is used for the track servo, the objective lens shift monitor signal indicates the objective lens shift quantity. Namely, the objective lens shift monitor signal can be used as a lens position signal.

On the other hand, the push-pull signal, when the compensated track servo signal is used for the track servo, indicates the objective lens shift quantity. That is, the push-pull signal can be used as the lens position signal only when the compensated track error signal is used for the track servo.

Thus, it is feasible to generate the lens position signal indicating the position of the objective lens by calculating the output of the divided-by-4 element of the photo detector 31. Therefore, the optical head can be reduced in weight because of having no necessity for mounting the lens position sensor on the optical head. Consequently, the seeking time can be reduced. Further, since the lens position sensor is not required to be provided, the costs for the optical head can be decreased.

Figure 10:
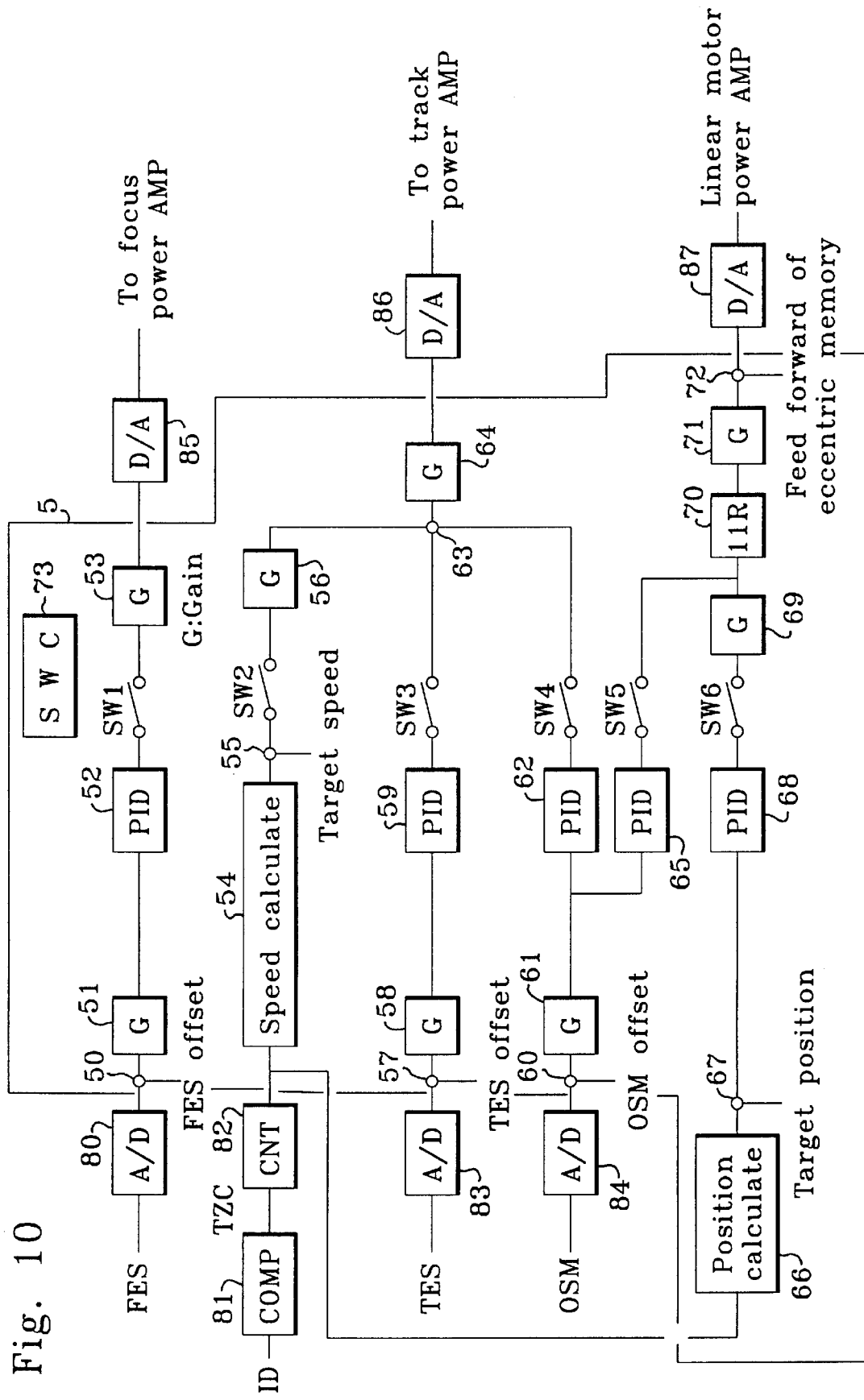
FIG. 10 is a block diagram showing a 2-stage servo system in one embodiment of the present invention.

Next, a track access process using the objective lens shift monitor signal will be explained. FIG. 10 is a block diagram showing a 2-stage servo system in one embodiment of the present invention. A 2-stage servo is to control the linear motor (the positioner) so that the light beam is located at the center of the objective lens in accordance with the lens position (objective lens shift monitor) signal when implementing the eccentricity compensating control.

Referring to FIG. 10, an analog/digital converter 80 converts the focus error signal FES into a digital value. An offset compensating unit 50 subtracts a focus error off set value from the focus error signal. A gain imparting unit 51 imparts a gain to the offset-compensated focus error signal. A PID control unit 52 performs PID (Proportional Integral and Differential) control of the focus error signal, thereby generating a focus drive signal.

A first switch SW1 is closed at the focus servo-ON time, thus forming a focus servo loop. The gain imparting unit 53 imparts the gain to the focus drive signal. A digital/analog converter 85 converts the focus drive signal into an analog quantity and output it to a focus power amplifier. Note that the focus power amplifier drives the focus actuator 21 (see FIG. 1). The focus servo control system is structured based on the construction described above.

A comparator 81 slices the track cross signal, thereby generating a track zero cross signal TZC. A counter 82 counts the track zero cross signals TZC. A speed calculating unit 54 calculates a real speed of the light beam on the basis of a value counted by the counter 82. A speed error calculating unit 55 calculates an error between the real speed and a target speed. A second switch SW2 is closed at a fine seek (track jump) time and outputs a fine seek quantity. A gain imparting unit 56 imparts a gain to the fine seek quantity.

An analog/digital converter 83 converts the track error signal TES into a digital value. An offset compensating unit 57 subtracts a track error offset value from the track error signal. A gain imparting unit 58 imparts a gain to the offset-compensated track error signal. A PID control unit 59 performs the PID (Proportional Integral and Differential) control of the track error signal, thereby generating a track servo drive signal. A third switch SW3 is closed at the track servo time, thus forming a track servo loop.

An analog/digital converter 84 converts the objective lens shift monitor signal OSM into a digital value. An offset compensating unit 60 subtracts a lens offset value from the objective lens shift monitor signal. A gain imparting unit 61 imparts a gain to the offset-compensated objective lens shift monitor signal. A PID control unit executes the PID Proportional Integral and Differential) control of the objective lens shift monitor signal. A fourth switch SW4 is closed when the objective lens is locked.

An adder unit 63 adds outputs of the second, third and fourth switches SW2, SW3, SW4. A gain imparting unit 64 imparts a gain to the output of the adder unit 63. A digital/analog converter 86 converts an addition signal into an analog quantity and outputs it to the track power amplifier. Note that the track power amplifier drives the track actuator 22 (see FIG. 1).

A PID control unit 65 executes the PID (Proportional Integral and Differential) control of the objective lens shift monitor signal. A fifth switch SW5 is closed when controlling the linear motor.

A present position calculating unit 66 calculates a present position from a value of the counter 82. A positional error calculating unit 67 subtracts the present position from a target position and thus calculates a positional error. A PID control unit 68 effects the PID (Proportional Integral and Differential) control of the positional error. A sixth switch SW6 is closed when in a linear motor control (coarse seek) process. A gain imparting unit 69 imparts a gain to the output of the switch SW6.

An IIR filter unit 70 filters the addition outputs of the switches SW5, SW6. A gain imparting unit 71 imparts a gain to the filter output. An eccentricity compensating unit 72 synthesizes an output of the gain imparting unit 71 with a feed forward control signal (an eccentric signal) given from the eccentricity memory (see FIG. 1), thereby generating a drive signal. A digital/analog converter 87 converts the drive signal into an analog quantity and outputs it to the linear motor power amplifier. Note that the linear motor power amplifier drives a linear motor (a positioner) 4 (see FIG. 1).

A main control unit 73 monitors the input signals FES, ID, TES, OSM, and controls the respective switches SW1–SW6. It is to be noted that the blocked portions designated by 50–73 are operations processed by the DSP 5.

Figure 11:
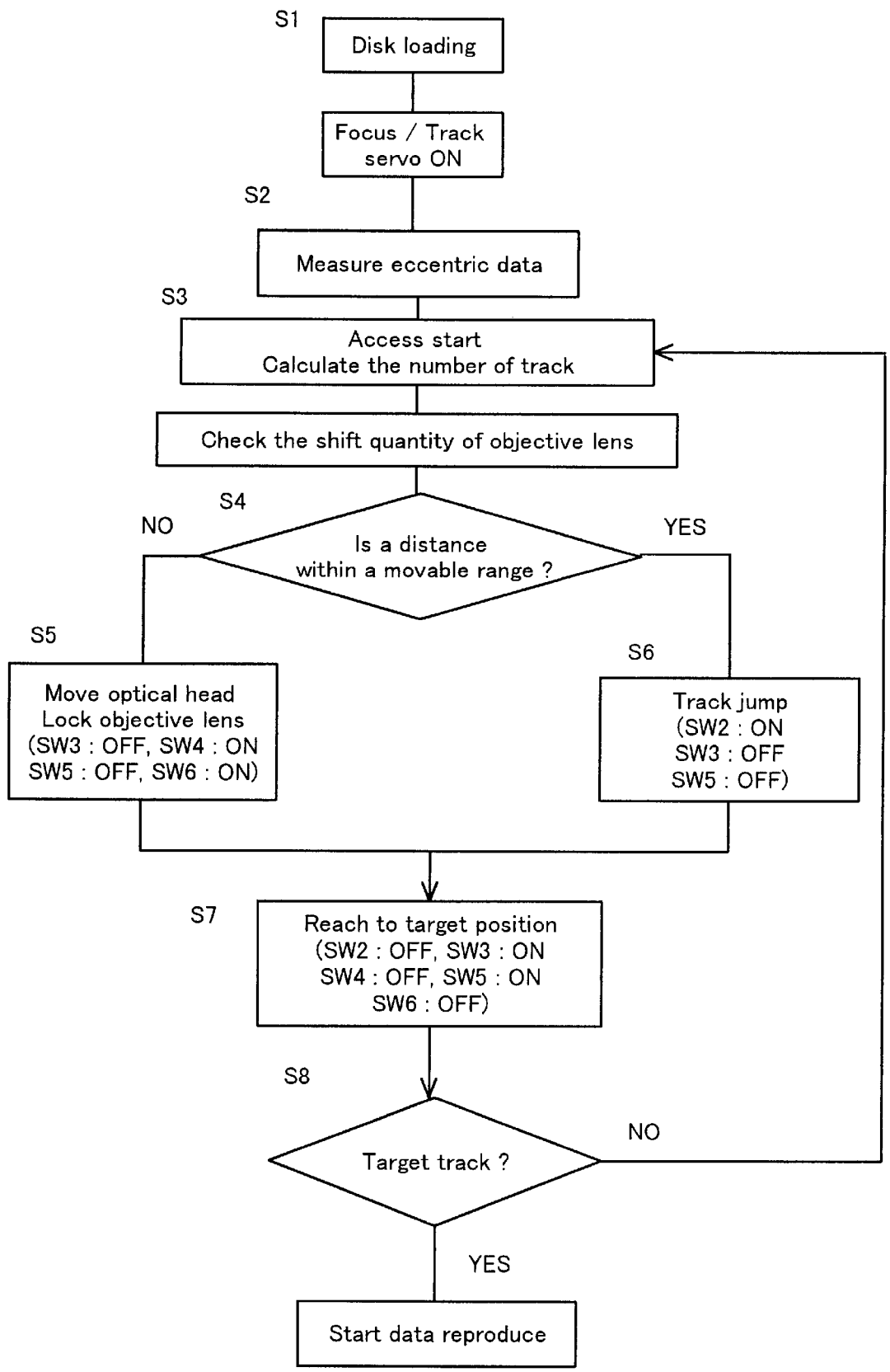
FIG. 11 is a flowchart showing an accessing process in one embodiment of the present invention.
Figure 13:
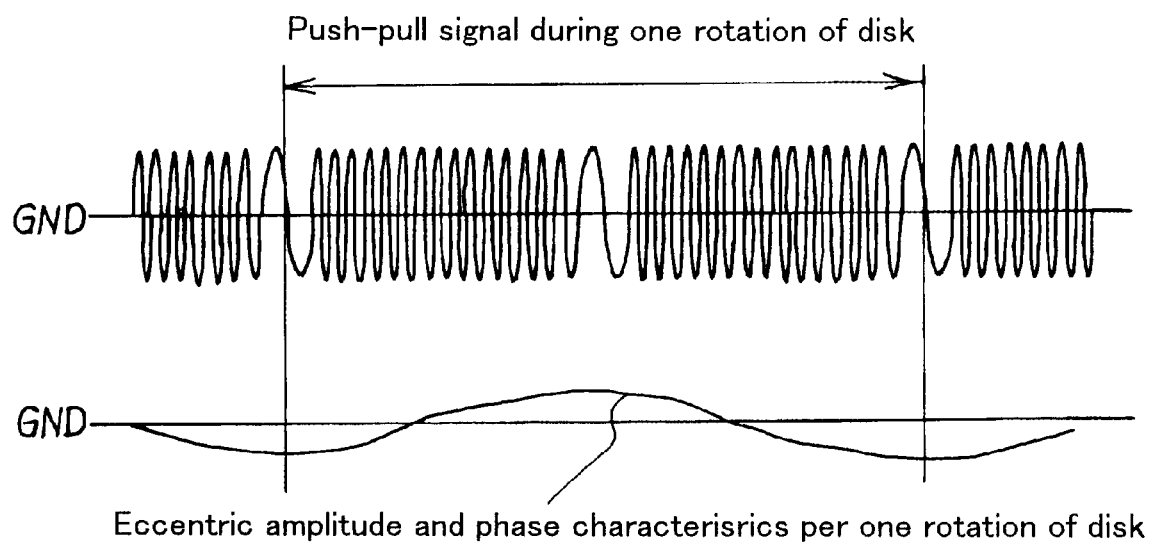
FIG. 13 is an explanatory diagram showing an eccentric data measuring operation in FIG. 12.

FIG. 11 is a flowchart showing an accessing process in one embodiment of the present invention. FIG. 12 is a flowchart showing an eccentric data measuring process. FIG. 13 is an explanatory diagram showing the eccentric data measuring operation.

(S1) When the magneto-optic disk is loaded, the main control unit 73 turns ON the first switch SW1 and switches ON the focus servo. Then, the main control unit 73 turns ON the third switch SW3 and switches ON the track servo.

(S2) The main control unit 73, as shown in FIGS. 12 and 13, measures the eccentric data, and is brought into a standby status.

(S3) The main control unit 73, upon receiving an access indication, grasps the present position on the basis of the signal ID, and counts the number of tracks from the present position to a target track. Then, the main control unit 73 detects a shift quantity of the objective lens from the objective lens shift monitor signal OSM.

(S4) The main control unit 73, from the objective lens shift quantity and from the number of tracks to the target position, judges whether or not a distance to that position falls within a movable range of the track actuator 22 (i.e., whether or not it is within an accessible range by using only the objective lens and a range in which the offset is almost ignorable).

(S5) The main control unit 73, if the distance exceeds the movable range of the track actuator 22, moves the movable member 2-1 of the optical head 2. Namely, the coarse seek is carried out. Therefore, the main control unit 73 turns ON the sixth switch SW6, and executes the positional control of the linear motor (the positioner) 4. At this time, the fifth switch SW5 is turned OFF.

Further, the objective lens 20 is locked in order to prevent a vibration of the objective lens 20 of the optical head 2, which is in the middle of its movement. That is to say, the third switch SW3 is turned OFF, and the track servo is switched OFF. Then, the fourth switch SW4 is turned ON, and the track actuator 22 is driven based on the objective lens shift monitor signal OSM.

(S6) The main control unit 73, if the distance does not exceed the movable range of the track actuator 22, effects a track jump. That is, the second switch SW2 is turned ON, and the speed control of the track actuator 22 is carried out. At this time, the third switch SW3 is turned OFF, and the track servo is switched OFF. Moreover, the fifth switch SW5 is turned OFF.

(S7) The main control unit 73 judges whether or not the optical head 2 arrives at the target position from the present position. The main control unit 73, when judging that the optical head 2 arrives at the target position, turns OFF the second switch SW2, turns ON the third switch SW3, turns OFF the fourth switch SW4, and switches ON the track servo. With this operation, the track actuator 22 is driven by the track error signal TES.

Further, the fifth switch SW5 is turned ON, the sixth switch SW6 is turned OFF, and the linear motor 4 is driven based on a difference between the eccentric data and the objective lens shift monitor signal OSM. Therefore, the positional control of the movable member 2-1 of the optical head 2 is conducted so that the light beam is located in the central position of the objective lens.

(S8) The main control unit 73, in this state, judges from the magneto-optic signal MO whether the track on which the light beam is located is a target track or not. The main control unit 73, if not the target track, returns to the access process in step S3. Whereas if the light-beam-located track is the target track, the main control unit 73 starts a data recording/reproducing process.

The eccentric data measuring process in FIG. 11 is explained with reference to FIG. 12.

(S10) The main control unit 73 turns OFF the third switch SW3, and switches OFF the track servo.

(S11) The main control unit 73, in this state, counts the number of eccentric tracks for one rotation of the disk 1 on the basis of the track cross (track zero cross) signal TZC (or the push-pull signal PP) (see FIG. 13).

(S12) The main control unit 73 turns ON the third switch SW3, and switches ON the track servo. Then, a reproducing process is effected upon a control track in the lead-in area on the disk, thus confirming a track pitch.

(S13) The main control unit 73 calculates an eccentric quantity from the number of eccentric tracks and from the track pitch.

(S14) The main control unit 73 takes in the objective lens shift monitor signals OSM for one rotation of the disk. An eccentric characteristic is thereby calculated from the eccentric quantity, and an amplitude and a phase of the objective lens shift monitor signal (see FIG. 13). Namely, an eccentric amplitude in each phase of the disk is calculated.

(S15) The main control unit 73 makes the eccentricity memory 6 (see FIG. 1) stored with the thus calculated eccentric characteristic.

Note that, as known well, the eccentric data in the eccentricity memory 6 is read out during the standby status of the DSP 5 in FIG. 10 and during the data reproducing process, and the linear motor 4 is feed-forward-driven. At this time, as described above, the objective lens shift monitor signal OSM is also fed back, and hence the positional control of the movable member 2-1 of the optical head 2 is conducted so that the light beam is located at the center of the objective lens.

Figure 14:
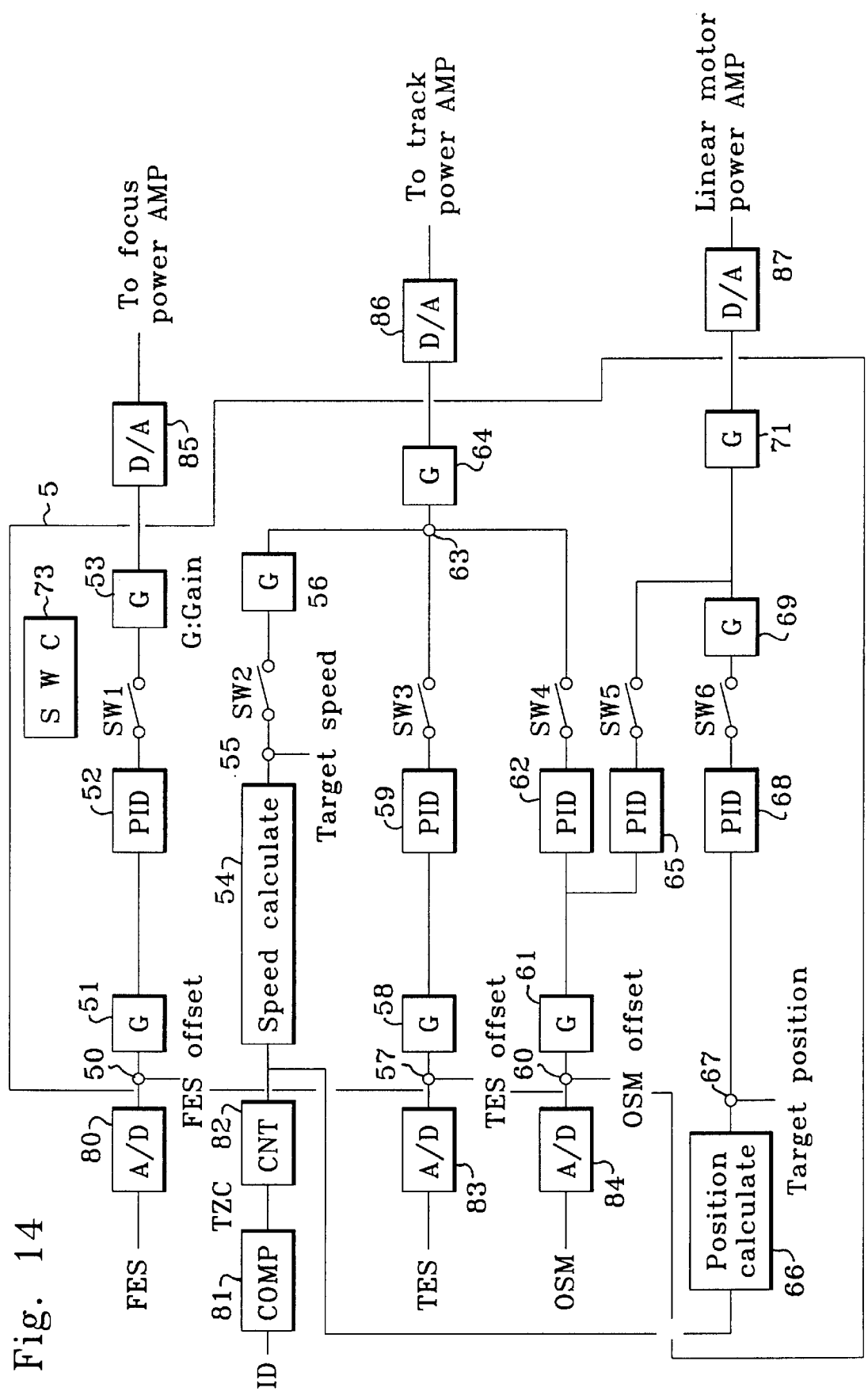
FIG. 14 is a block diagram showing another servo system in another embodiment of the present invention.

FIG. 14 is a block diagram showing a servo system in another embodiment of the present invention. In FIG. 14, the same components illustrated in FIG. 10 are marked with the like numerals. Shown in this embodiment is an example where the 2-stage servo not involving the eccentric control is not carried out. That is, in comparison with FIG. 10, the eccentricity compensating unit is omitted.

Figure 15:
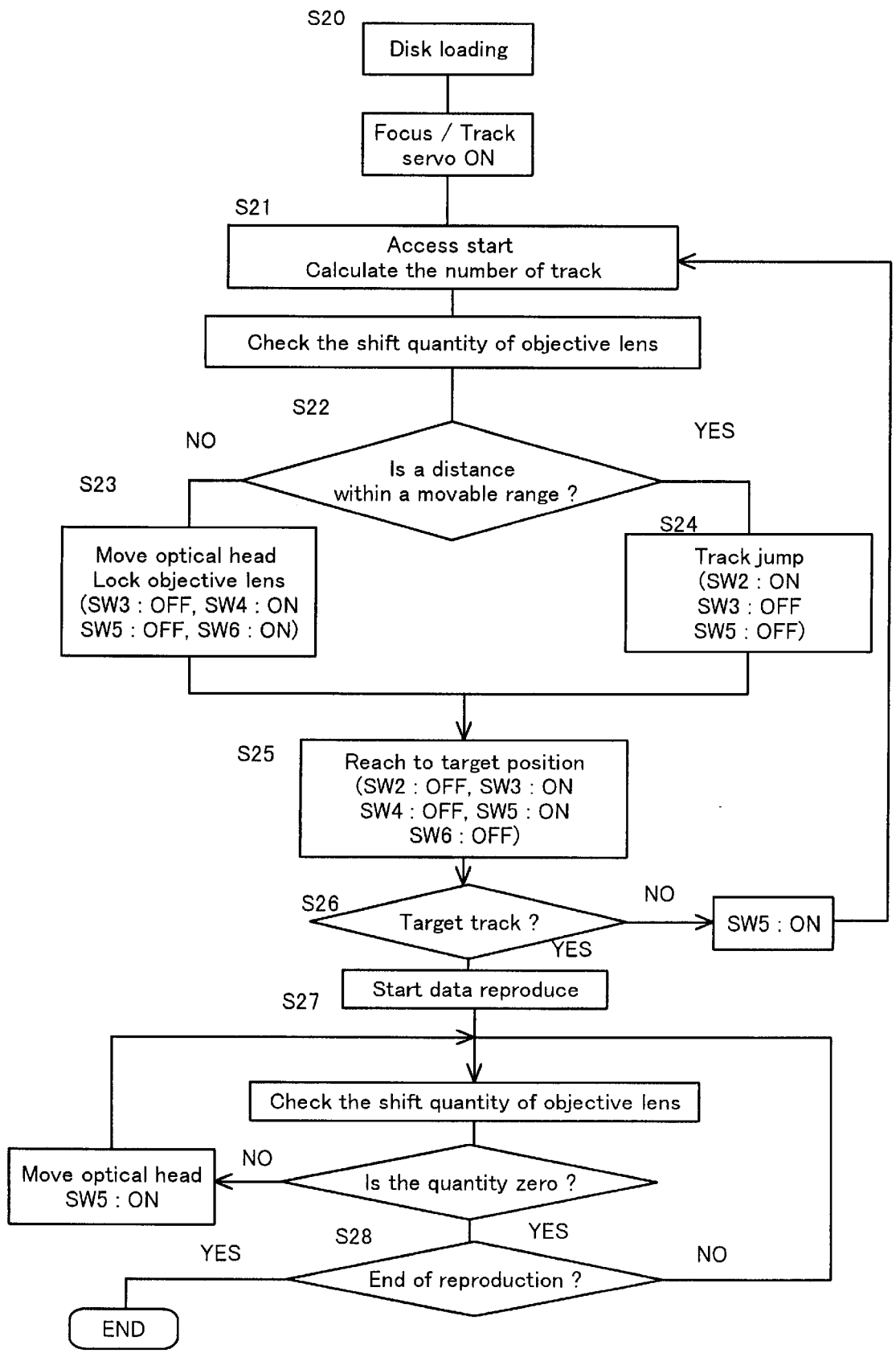
FIG. 15 is a flowchart showing another accessing process in another embodiment of the present invention.
Figure 16:
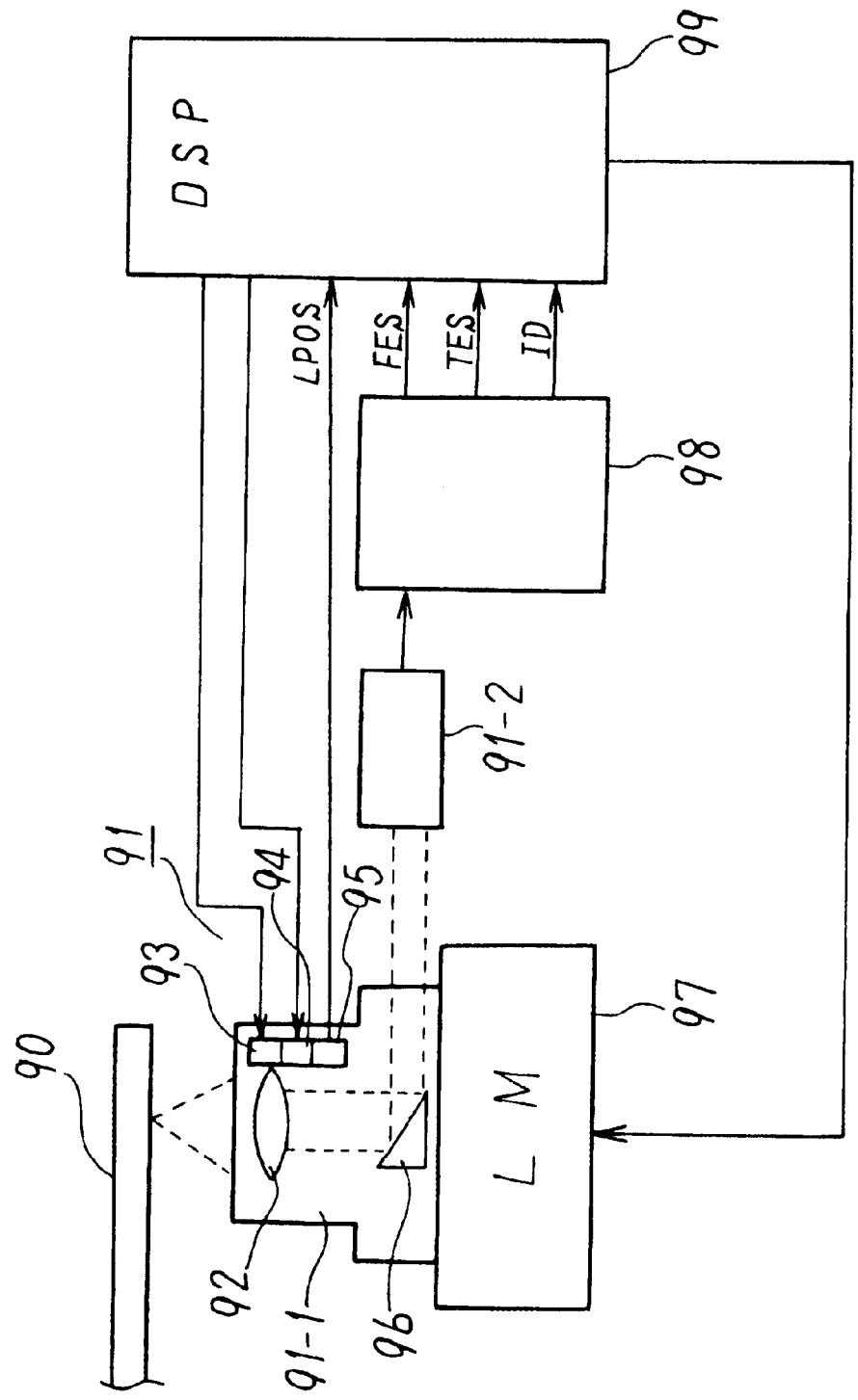
FIG. 16 is an explanatory diagram showing the prior art.

FIG. 15 is a flowchart showing an accessing process in another embodiment of the present invention.

(S20) When the magneto-optic disk is loaded, the main control unit 73 turns ON the first switch SW1 and switches ON the focus servo. Then, the main control unit 73 turns ON the third switch SW3, switches ON the track servo and is brought into the standby status.

(S21) The main control unit 73, upon receiving an access indication, grasps the present position on the basis of the signal ID, and calculates the number of tracks from the present position to a target track. Then, the main control unit 73 detects a shift quantity of the objective lens from the objective lens shift monitor signal OSM.

(S22) The main control unit 73, from the objective lens shift monitor signal and from the number of, judges whether or not a distance to the target position falls within a movable range of the track actuator 22 (i.e., whether or not it is within an accessible range by using only the objective lens and a range in which the offset is almost ignorable).

(S23) The main control unit 73, if the distance exceeds the movable range of the track actuator 22, moves the movable member 2-1 of the optical head 2. Therefore, the main control unit 73 turns ON the sixth switch SW6, and executes the positional control of the linear motor (the positioner) 4. At this time, the fifth switch SW5 is turned OFF.

Further, the objective lens 20 is locked in order to prevent a vibration of the objective lens 20 of the optical head 2, which is in the middle of its movement. That is to say, the third switch SW3 is turned OFF, and the track servo is switched OFF. Then, the fourth switch SW4 is turned ON, and the track actuator 22 is driven based on the objective lens shift monitor signal OSM.

(S24) The main control unit 73, if the distance does not exceed the movable range of the track actuator 22, effects a track jump. That is, the second switch SW2 is turned ON, and the speed control of the track actuator 22 is carried out. At this time, the third switch SW3 is turned OFF, and the track servo is switched OFF. Moreover, the fifth switch SW5 is turned OFF.

(S25) The main control unit 73 judges whether or not the optical head 2 arrives at the target position from the present position. The main control unit 73, when judging that the optical head 2 arrives at the target position, turns OFF the second switch SW2, turns ON the third switch SW3, turns OFF the fourth switch SW4, and switches ON the track servo. With this operation, the track actuator 22 is driven by the track error signal TES. Further, the sixth switch SW6 is turned OFF, and the linear motor 4 is stopped.

(S26) The main control unit 73, in this state, judges from the magneto-optic signal MO whether the track on which the light beam is located is a target track or not. The main control unit 73, if not the target track, turns ON the fifth switch SW5, and the linear motor 4 is driven based on the objective lens shift monitor signal OSM. Therefore, the positional control of the movable member 2-1 of the optical head 2 is executed so that the light beam is located in the central position of the objective lens. Then, the main control unit 73 moves back to the accessing process in step S21. Whereas if the light-beam-located track is the target track, the main control unit 73 starts the data recording/reproducing process.

(S27) The main control unit 73 checks the lens shift quantity based on the objective lens shift monitor signal OSM. The main control unit 73 judges whether the objective lens shift quantity is zero or not. The main control unit 73, if the objective lens shift quantity is not zero, turns ON the fifth switch SW5, and drives the linear motor 4 in accordance with the objective lens shift monitor signal OSM. Therefore, the positional control of the movable member 2-1 of the optical head 2 is performed so that the light beam is located in the central position of the objective lens.

(S28) The main control unit 73, if the objective lens shift quantity is zero, judges whether or not the reproducing process comes to an end. If the reproducing process is not finished, the processing returns to step S27. If the reproducing process is finished, the accessing process comes to an end.

Thus, the main control unit 73 executes the positional control of the movable member 2-1 of the optical head 2 so that the light beam is located in the central position of the objective lens by checking the objective lens shift quantity during also the data reproducing/recording process. The deviation of the light beam from the track can be therefore prevented.

The present invention can be modified as follows in addition to the embodiments discussed above.

(1) The optical storage medium has been explained so far by way of the magneto-optic disk, however, what can be applied as other optical storage mediums is an optical disk, a phase-change type optical disk and an optical card etc.

(2) The track accessing process can be, though explained in the examples in FIGS. 11 and 15, applied to other track accessing processes.

(3) The optical head has been so far explained by way of the separation type head constructed of the movable member and the fixed member but may involve the use of an integral type head.

(4) The moving mechanism has been described so far by way of the linear motor but may use other moving mechanisms.

The present invention has been discussed by way of the embodiments but may be modified in many forms within the range of the gist of the present invention, and these modifications are not excluded from the scope of the present invention.

As explained above, the present invention exhibits the effects which follow, (1) The laser beam scans obliquely across the tracks on the optical storage medium, and the shift signal for indicating the objective lens shift quantity is calculated based on the output of the divided-by-4 light receiving unit. It is therefore feasible to detect the position of the objective lens even without providing the lens position sensor. The weight of the optical head can be thereby reduced, and the seeking process can be speeded up.

(2) Further, since the lens position sensor is not required to be provided, the costs for the optical head can be decreased.

What is claimed is:

1. An optical storage device for at least reading information from an optical storage medium by an optical head, comprising:
   an optical head including an objective lens for irradiating said optical storage medium with a laser beam, a track actuator for driving said objective lens for scanning said laser beam at a slant across tracks on said optical storage medium, and a divided-by-4 light receiving unit for receiving the laser beam from said optical storage medium;
   moving means for moving at least said objective lens and said track actuator of said optical head;
   a first signal processing unit for calculating a track error signal on the basis of outputs of said divided-by-4 light receiving unit;
   a second signal processing unit for calculating a shift signal for indicating a shift quantity of said objective lens on the basis of the output of said divided-by-4 light receiving unit; and
   a control unit for controlling one of said track actuator and said moving means by the track error signal, and controlling another one of said track actuator and said moving means so that the laser beam passing through said objective lens is located at the center of said objective lens according to said shift signal,
   wherein said first signal processing unit comprises a differential circuit for calculating an X-directional change in a reflected light distribution of said divided-by-4 light receiving unit; and
   said second signal processing unit comprises a differential circuit for calculating a Y-directional change in said reflected light distribution of said divided-by-4 light receiving unit, said X and Y direction being in an orthogonal relationship.

2. The optical storage device according to claim 1,
   wherein said control unit includes a servo-controller for servo-controlling said track actuator by the shift signal when controlling said moving means on the basis of the track error signal.

3. The optical storage device according to claim 1, further comprising a memory for storing an eccentric signal for indicating an eccentric characteristic of said optical storage medium, wherein said control unit controls said moving means on the basis of the shift signal and the eccentric signal for indicating the eccentric characteristic of said optical storage medium.

4. The optical storage device according to claim 3, wherein said control unit measures the eccentric signal for indicating the eccentric characteristic of said optical storage medium from the shift signal.

5. The optical storage device according to claim 1,
   wherein said control unit includes a controller for controlling said moving means so that a central value of the shift signal becomes zero.

6. The optical storage device according to claim 1, wherein said optical head includes a movable member mounted with said objective lens and said track actuator and moved by said moving means, and a fixed member having said divided-by-4 light receiving unit.

7. A light beam position control method of an optical head including an objective lens for irradiating an optical storage medium with a laser beam, a track actuator for driving said objective lens for scanning said laser beam at a slant across tracks on said optical storage medium, moving means for moving at least said objective lens and said track actuator of said optical head, and a divided-by-4 light receiving unit for receiving the laser beam from said optical storage medium, comprising;
   a step of calculating a track error signal on the basis of an X-directional change in a reflected light distribution of said divided-by-4 light receiving unit;
   a step of calculating a shift signal for indicating a shift quantity of said objective lens on the basis of calculating a Y-directional change in said reflected light distribution of said divided-by-4 light receiving unit, said X and Y direction being in an orthogonal relationship; and a step of controlling one of said track actuator and said moving means for moving at least said objective lens and said track actuator of said optical head by the track error signal, and controlling another one of said track actuator and said moving means so that the laser beam passing through said objective lens is located at the center of said objective lens according to said shift signal.

8. The light beam position control method according to claim 7, wherein said controlling step unit includes a servo-controlling step of servo-controlling said track actuator by the shift signal when controlling said moving means on the basis of the track error signal.

9. The light beam position control method according to claim 7, wherein said controlling step includes an eccentric compensation controlling step of controlling said moving means on the basis of the shift signal and the eccentric signal, for indicating the eccentric characteristic of said optical storage medium.

10. The light beam position control method according to claim 9, further comprising a measuring step of measuring the eccentric signal for indicating the eccentric characteristic of said optical storage medium from the shift signal.

11. The light beam position control method according to claim 7, wherein said controlling step includes a step of controlling said moving means so that a central value of the shift signal becomes zero.

12. A light beam position control device of an optical head including an objective lens for irradiating an optical storage medium with a laser beam, a track actuator for driving said objective lens for scanning said laser beam at a slant across tracks on said optical storage medium, moving means for moving at least said objective lens and said track actuator of said optical head, and a divided-by-4 light receiving unit for receiving the laser beam from said optical storage medium, comprising;

a first signal processing unit for calculating a track error signal on the basis of an X-directional change in a reflected light distribution of said divided-by-4 light receiving unit from outputs of said divided-by-4 light receiving unit;

a second signal processing unit for calculating a shift signal for indicating a shift quantity of said objective lens on the basis of a Y-directional change in said reflected light distribution of said divided-by-4 light receiving unit, said X and Y direction being in an orthogonal relationship; and a control unit for controlling one of said track actuator and said moving means for moving at least said objective lens and said track actuator of said optical head by the track error signal, and controlling another one of said track actuator and said moving means so that the laser beam passing through said objective lens is located at the center of said objective lens according to said shift signal.

13. The light beam position control device according to claim 12, wherein said control unit includes a servo-controller for servo-controlling said track actuator by the shift signal when controlling said moving means on the basis of the track error signal.

14. The light beam position control device according to claim 12, wherein said control unit includes a eccentric compensation controlling unit for controlling said moving means on the basis of the shift signal and the eccentric signal, for indicating the eccentric characteristic of said optical storage medium.

15. The light beam position control device according to claim 14, wherein said control unit includes a measuring unit for measuring the eccentric signal for indicating the eccentric characteristic of said optical storage medium from the shift signal.

16. The light beam position control device according to claim 12, wherein said control unit includes a controller for controlling said moving means so that a central value of the shift signal becomes zero.

* * * * *

UNITED STATES PATENT AND TRADEMARK OFFICE
CERTIFICATE OF CORRECTION

PATENT NO. : 6,266,301 B1
DATED : July 24, 2001
INVENTOR(S) : Morimoto

It is certified that error appears in the above-identified patent and that said Letters Patent is hereby corrected as shown below:

<u>Title page,</u>
Please amend the title of the invention to -- OPTICAL STORAGE DEVICE AND OPTICAL HEAD HAVING TES COMPENSATION AND SHIFT SIGNAL COMPENSATION --.
References Cited, FOREIGN PATENT DOCUMENTS:
Please delete "9631928" and insert -- 19631928 -- therefor.

Signed and Sealed this

Sixteenth Day of April, 2002

Attest:

JAMES E. ROGAN
*Attesting Officer*  *Director of the United States Patent and Trademark Office*